US011271336B2

(12) United States Patent
Nakamura

(10) Patent No.: US 11,271,336 B2
(45) Date of Patent: Mar. 8, 2022

(54) CONNECTOR

(71) Applicant: JAPAN AVIATION ELECTRONICS INDUSTRY, LIMITED, Tokyo (JP)

(72) Inventor: Tomohiro Nakamura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 16/898,592

(22) Filed: Jun. 11, 2020

(65) Prior Publication Data
US 2021/0036449 A1    Feb. 4, 2021

(30) Foreign Application Priority Data
Jul. 30, 2019 (JP) .............................. JP2019-140108

(51) Int. Cl.
*H01R 12/71* (2011.01)
*H01R 13/627* (2006.01)

(52) U.S. Cl.
CPC ......... *H01R 12/716* (2013.01); *H01R 13/627* (2013.01)

(58) Field of Classification Search
CPC ............ H01R 12/7076; H01R 12/7094; H01R 12/712; H01R 12/714; H01R 12/716;
(Continued)

(56) References Cited

U.S. PATENT DOCUMENTS

| 7,537,486 B2 | 5/2009 | Hong et al. |
| 7,866,988 B2 | 1/2011 | Shimada |
| 2009/0286416 A1* | 11/2009 | Wu ...................... G06K 7/0069 439/328 |

FOREIGN PATENT DOCUMENTS

| JP | 2007207519 A | 8/2007 |
| JP | 2008305786 A | 12/2008 |

(Continued)

OTHER PUBLICATIONS

Chinese Office Action (and English language translation thereof) dated Sep. 2, 2021, issued in counterpart Chinese Application No. 202010597129.0.

(Continued)

*Primary Examiner* — Oscar C Jimenez
(74) *Attorney, Agent, or Firm* — Holtz, Holtz & Volek PC

(57) ABSTRACT

A connector comprises a base, a plurality of terminals and a detection portion. The detection portion comprises a first contact piece and a second contact piece. The first contact piece has a contact target portion. The second contact piece has a contact main portion and an intersecting portion. The contact main portion is resiliently deformable. The resilient deformation changes a contact state of the contact main portion relative to the contact target portion. The intersecting portion is, at least in part, positioned in a card accommodating portion. The intersecting portion intersects with both an up-down direction and a horizontal plane perpendicular to the up-down direction. When a card pushes the intersecting portion downward in the up-down direction upon accommodation of the card within the card accommodating portion, the intersecting portion resiliently deforms the contact main portion in the horizontal plane so that the contact state is changed.

5 Claims, 5 Drawing Sheets

(58) Field of Classification Search
CPC ........ H01R 12/83; H01R 12/85; H01R 12/88; H01R 13/627
See application file for complete search history.

(56) References Cited

FOREIGN PATENT DOCUMENTS

| | | |
|---|---|---|
| JP | 2010153200 A | 7/2010 |
| TW | M349076 U | 1/2009 |
| TW | M381185 U | 5/2010 |
| TW | M509460 U | 9/2015 |
| TW | I584540 B | 5/2017 |

OTHER PUBLICATIONS

Taiwanese Office Action (and English language translation thereof) dated Jun. 7, 2021, issued in counterpart Taiwanese Application No. 109120375.

\* cited by examiner

CONNECTOR

CROSS REFERENCE TO RELATED APPLICATIONS

This application is based on and claims priority under 35 U.S.C. § 119 to Japanese Patent Application No. JP2019-140108 filed Jul. 30, 2019, the contents of which are incorporated herein in their entirety by reference.

BACKGROUND OF THE INVENTION

This invention relates to a connector comprising a detection portion for detecting that a card is accommodated in the connector.

Referring to FIG. 10, JPA2010-153200 (Patent Document 1) discloses a connector 900 comprising a base 910, a plurality of terminals 920, a detection portion 930 and a cover 940. The base 910 defines a card accommodating portion 960 which is able to accommodate a card. The terminals 920 and the detection portion 930 are held by the base 910 and are positioned inside the card accommodating portion 960. When a card (not shown) is accommodated in the card accommodating portion 960, the terminals 920 are connected with pads of the card. The detection portion 930 detects that the card is accommodated in the card accommodating portion 960. The cover 940 is attached to the base 910 via hinge mechanisms 970 so as to be openable and closable.

In an assumption that the connector, for example, comprise an increased number of the terminals, it is preferable for the detection portion to occupy a reduced space in the card accommodating portion.

SUMMARY OF THE INVENTION

It is therefore an object of the present invention to provide a connector whose detection portion can occupy a reduced space in a card accommodating portion.

One aspect of the present invention provides a connector mountable on a circuit board. The connector comprises a base, a plurality of terminals and a detection portion. The base defines a card accommodating portion which is able to accommodate a card from above in an up-down direction. The terminals are held by the base. The detection portion comprises a first contact piece and a second contact piece. The first contact piece is held by the base. The first contact piece has a contact target portion. The second contact piece is held by the base. The second contact piece has a contact main portion and an intersecting portion. The contact main portion is resiliently deformable. The resilient deformation changes a contact state of the contact main portion relative to the contact target portion. The intersecting portion is, at least in part, positioned in the card accommodating portion. The intersecting portion intersects with both the up-down direction and a horizontal plane perpendicular to the up-down direction. When the card pushes the intersecting portion downward in the up-down direction upon accommodation of the card within the card accommodating portion, the intersecting portion resiliently deforms the contact main portion in the horizontal plane so that the contact state is changed.

The detection portion of the connector according to the present invention has the features as follows: the intersecting portion is, at least in part, positioned in the card accommodating portion; the intersecting portion intersects with both the up-down direction and the horizontal plane; and, when the intersecting portion is pushed downward by the card, the intersecting portion resiliently deforms the contact main portion in the horizontal plane so that the contact state of the contact main portion relative to the contact target portion is changed. As described above, the intersecting portion converts a downward force to a force in a horizontal direction. Thus, the intersecting portion itself can occupy a reduced space in the card accommodating portion.

An appreciation of the objectives of the present invention and a more complete understanding of its structure may be had by studying the following description of the preferred embodiment and by referring to the accompanying drawings.

Figure 1:
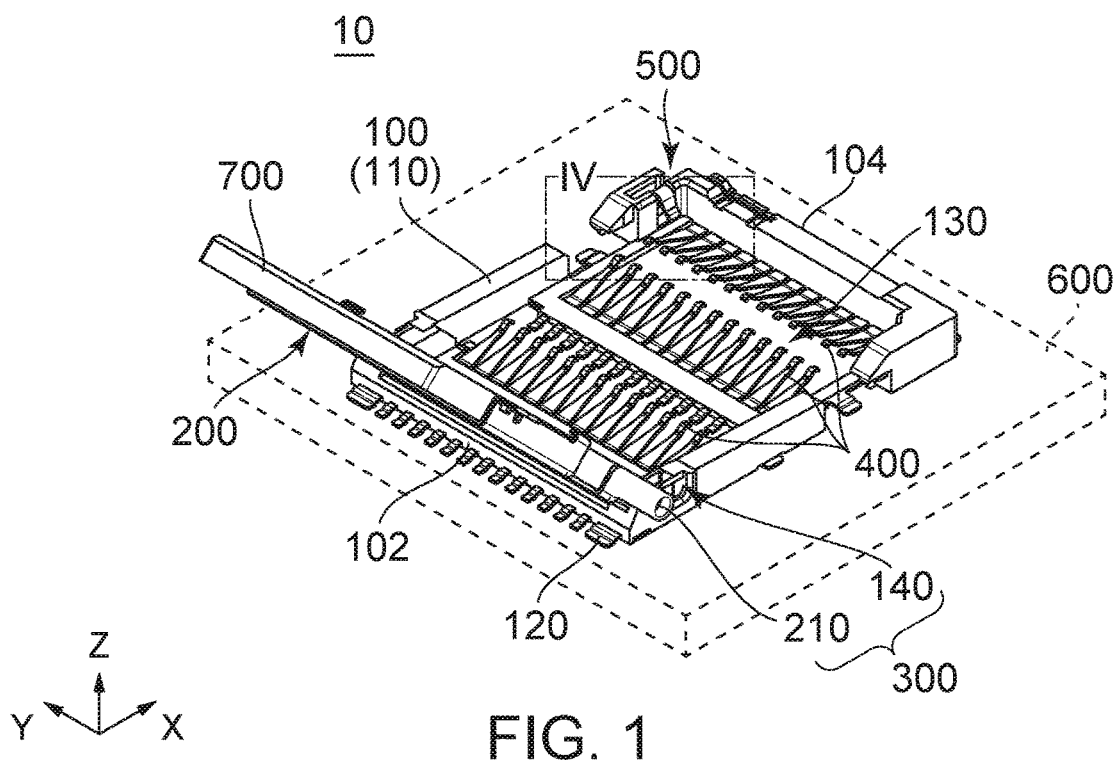
FIG. 1 is a perspective view showing a connector according to an embodiment of the present invention. In the figure, a card is held by a cover and the cover is opened.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Referring to FIGS. 1, 2, 8 and 9, a connector 10 according to an embodiment of the present invention is configured to be mounted on a circuit board 600 and to connect pads of a card 700 with patterns which is formed on the circuit board 600. In the figures, the patterns on the circuit board 600 and the pads of the card 700 are omitted. The card 700 is, for example, a memory card. However, the present invention is not limited thereto. The connector 10 is applicable to connectors used for a variety of types of cards.

Figure 2:
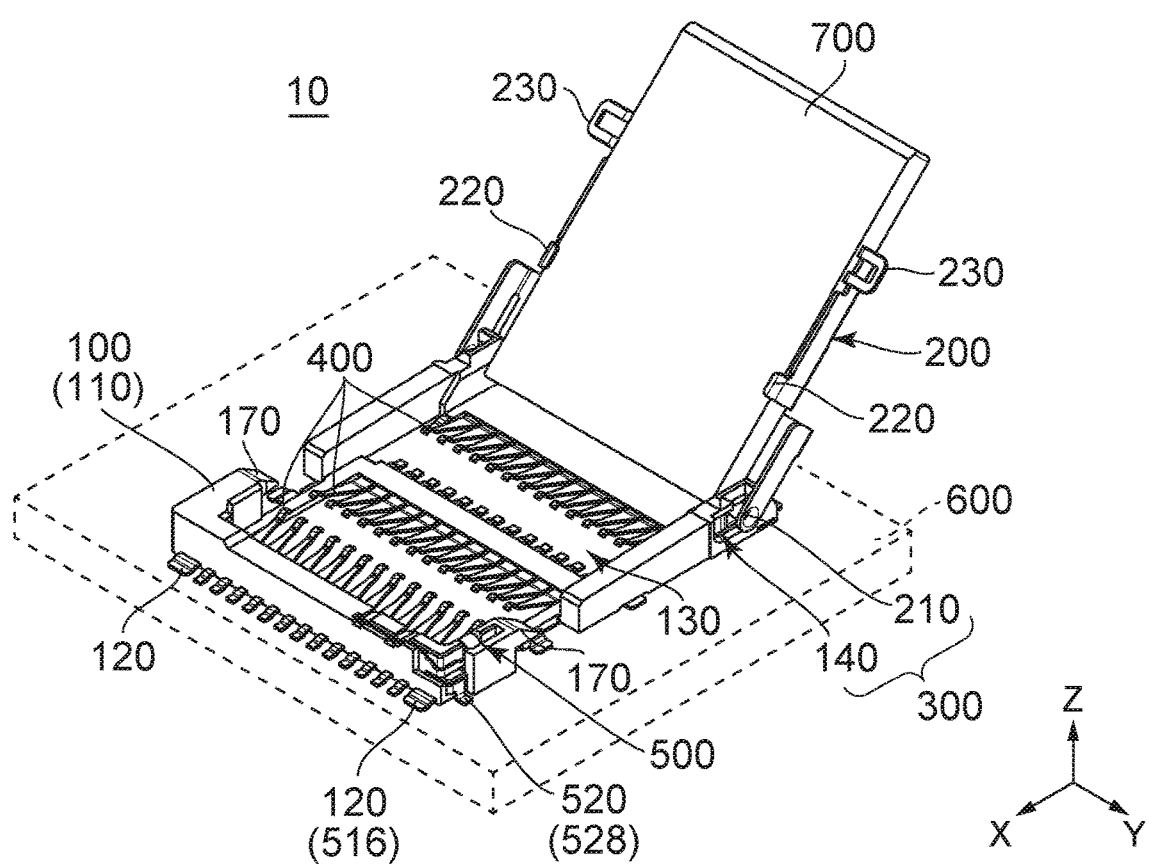
FIG. 2 is another perspective view showing the connector of FIG. 1.

As shown in FIGS. 1 and 2, the connector 10 according to the present embodiment comprises a base 100, a cover 200, hinge mechanisms 300, a plurality of terminals 400 and a detection portion 500.

As shown in FIGS. 1 and 2, the base 100 has a front end 102 and a rear end 104 in a front-rear direction. In the present embodiment, the front-rear direction is an X-direction. Specifically, forward is a negative X-direction while rearward is a positive X-direction. The base 100 of the present embodiment comprises a holding member 110 and reinforcing members 120. Specifically, the holding member 110 is made of insulator and each of the reinforcing members 120 is made of metal. In the base 100 of the present embodiment, each of the reinforcing members 120 is partially embedded in the holding member 110 via insert-molding. However, the present invention is not limited thereto. The base 100 may, for example, be only made of insulator.

Figure 3:
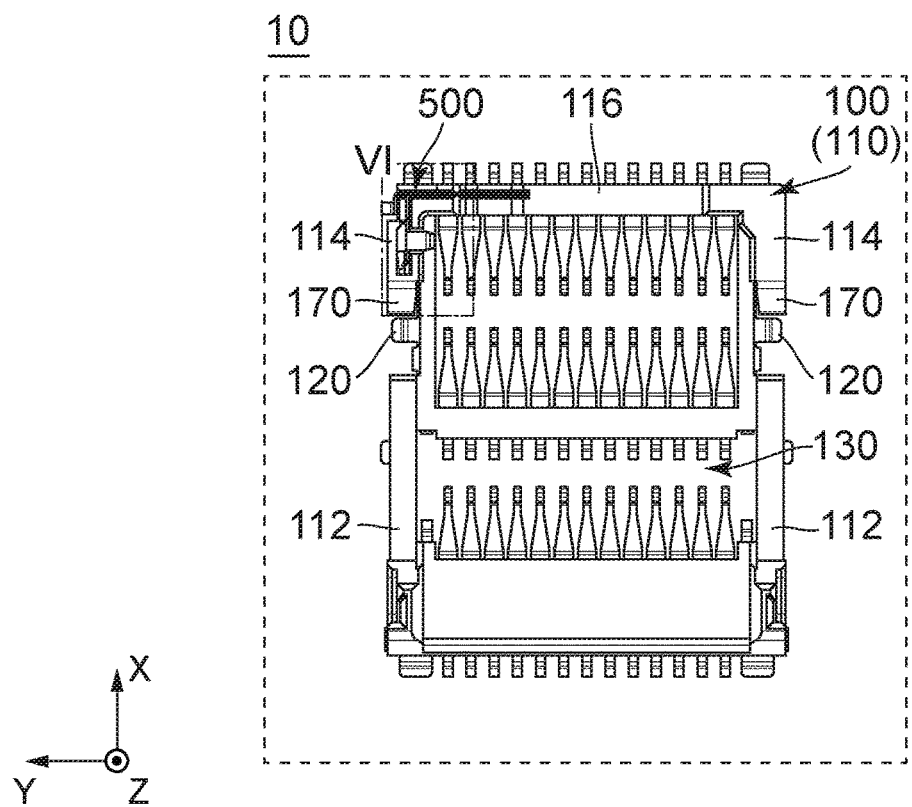
FIG. 3 is a top view showing the connector of FIG. 1. In the figure, the cover is omitted.

Referring to FIG. 3, the holding member 110 of the base 100 has two first side walls 112, two second side walls 114 and a rear wall 116. The two first side walls 112 are positioned apart from each other in a lateral direction perpendicular to the front-rear direction. In the present embodiment, the lateral direction is a Y-direction. It is assumed that leftward is a positive Y-direction while rightward is a negative Y-direction. The two second side walls 114 correspond to the two first side walls 112, respectively. The first side wall 112 and the corresponding second side wall 114 are positioned apart from each other in the front-rear direction. The first side wall 112 and the corresponding second side wall 114 are arranged along the front-rear direction. The rear wall 116 extends in the lateral direction and couples rear ends of the second side walls 114 with each other.

Referring to FIGS. 1 to 3, the first side walls 112, the second side walls 114 and the rear wall 116 of the holding member 110 as described above define a card accommodating portion 130 which is able to accommodate the card 700 from above in an up-down direction. In other words, the base 100 according to the present embodiment defines the card accommodating portion 130 which is able to accommodate the card 700 from above in the up-down direction. However, the present invention is not limited thereto. The base 100 may have any structure, provided that the base 100 defines the card accommodating portion 130 which is able to accommodate the card 700 from above in the up-down direction. In the present embodiment, the up-down direction is a Z-direction. Specifically, upward is a positive Z-direction while downward is a negative Z-direction.

Figure 4:
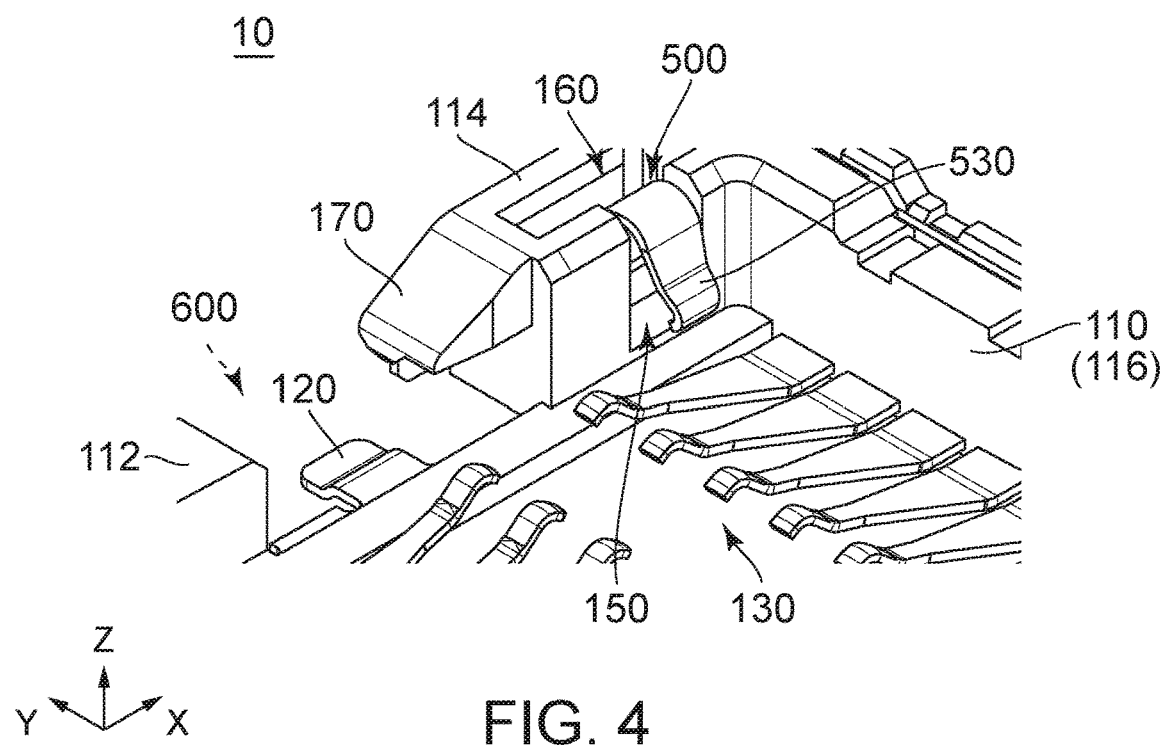
FIG. 4 is an enlarged, perspective view showing a part of the connector of FIG. 1.
Figure 6:
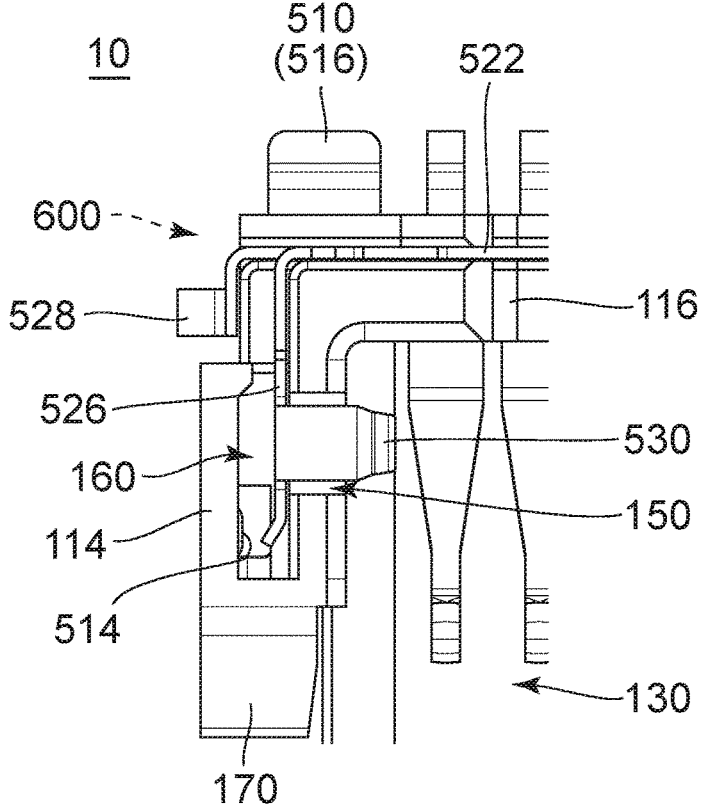
FIG. 6 is an enlarged, top view showing a part of the connector of FIG. 1.

Referring to FIGS. 1 to 4 and 6, the base 100 is provided with two bearings 140, a receiving portion 150, a deformation allowing portion 160 and two locking portions 170. As shown in FIGS. 1 and 2, the bearings 140 are provided in the vicinities of front ends of the first side walls 112, respectively. Each of the bearings 140 is a hole which is recessed inward in the lateral direction and which extends long in the front-rear direction. As shown in FIGS. 4 and 6, the receiving portion 150 is provided on the second side wall 114 which is positioned at a left side of the holding member 110. The receiving portion 150 communicates with the card accommodating portion 130 in the lateral direction. The deformation allowing portion 160 is provided at an inside of the second side wall 114 which is positioned at the left side of the holding member 110. Specifically, the deformation allowing portion 160 is positioned outside the card accommodating portion 130. The deformation allowing portion 160 communicates with the receiving portion 150. In other words, the deformation allowing portion 160 communicates with the card accommodating portion 130 through the receiving portion 150. The locking portions 170 are provided in the vicinities of front ends of the second side walls 114, respectively.

Referring to FIGS. 1 and 2, the cover 200 according to the present embodiment is made of metal. As shown in FIG. 2, the cover 200 is provided with two axis portions 210, two card holding portions 220 and two locked portions 230. The two axis portions 210 extend toward each other in the lateral direction. The two axis portions 210 are positioned apart from each other in the lateral direction. The card holding portions 220 are configured to hold the card 700 in the cover 200. Each of the locked portions 230 extends outward in the lateral direction.

Referring to FIGS. 1 and 2, the bearings 140 of the base 100 and the axis portions 210 of the cover 200 form the hinge mechanisms 300, respectively. As shown in FIG. 1, in the front-rear direction, each of the hinge mechanisms 300 is provided at a position which is closer to the front end 102 of the base 100 than to the rear end 104 of the base 100. Specifically, the axis portions 210 are received in the bearings 140, respectively. In other words, the cover 200 is attached to the base 100 by the hinge mechanisms 300. Thus, the cover 200 is openable and closable relative to the base 100, and is movable in the front-rear direction within a predetermined range. The cover 200 is opened under an opened state shown in each of FIGS. 1 and 2. When the cover 200 is rotated from the opened state, the cover 200 passes through a state shown in FIG. 8 and is closed. After that, the cover 200 is moved reward in the front-rear direction to reach a state shown in FIG. 9. At that time, the locked portions 230 of the cover 200 are positioned below the locking portions 170, respectively, of the base 100. Thus, the cover 200 continues to be closed and is prevented from being unintentionally opened.

Figure 9:
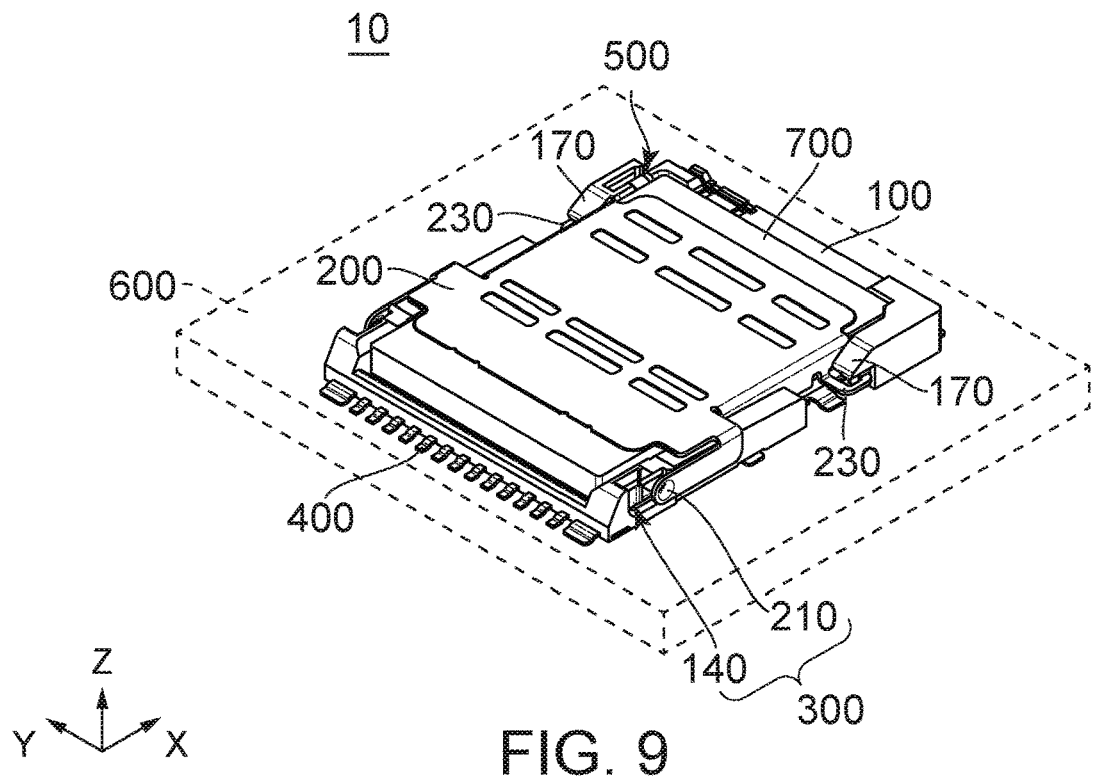
FIG. 9 is a perspective view showing the connector of FIG. 1. In the figure, the cover is closed and locked.
Figure 10:
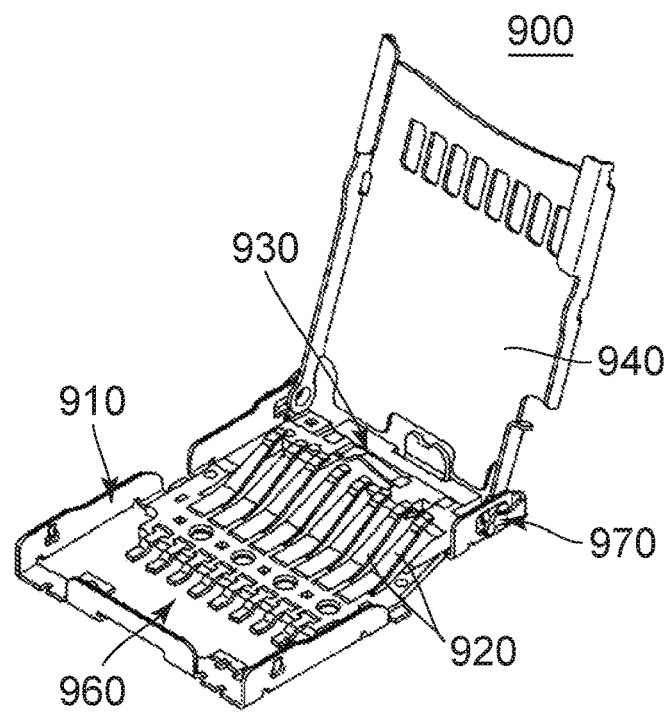
FIG. 10 is a perspective view showing a connector of Patent Document 1.

As described above, the cover 200 is provided with the card holding portions 220. Referring to FIGS. 2 and 9, when the cover 200, which holds the card 700 by using the card holding portions 220, is closed, the card 700 is accommodated in the card accommodating portion 130.

Referring to FIGS. 1 and 2, each of the terminals 400 according to the present embodiment is made of metal. The terminals 400 are held by the holding member 110 of the base 100 and are arranged in three rows.

As shown in FIGS. 1 and 2, the detection portion 500 according to the present embodiment is positioned closer to the rear end 104 of the base 100 than to the front end 102 of the base 100. Specifically, the detection portion 500 is positioned far away from any of the hinge mechanisms 300 in the front-rear direction. Thus, when the cover 200 holding the card 700 is closed so that the card 700 is accommodated in the card accommodating portion 130, the card 700 abuts against the detection portion 500 substantially from above.

Referring to FIGS. 4 to 7, the detection portion 500 according to the present embodiment comprises a first contact piece 510 and a second contact piece 520. Specifically, both of the first contact piece 510 and the second contact piece 520 are made of metal.

The first contact piece 510 is held by the base 100. In particular, the first contact piece 510 of the present embodiment is composed of a part of the reinforcing member 120 of the base 100. Specifically, the first contact piece 510 is partially embedded in the holding member 110 of the base 100 and is held thereby. In detail, the first contact piece 510 has a first held portion 512, a contact target portion 514 and a first fixed portion 516. The first held portion 512 is held by the second side wall 114 which is positioned at the left side of the holding member 110. The contact target portion 514 is exposed in the deformation allowing portion 160. Specifically, the contact target portion 514 is positioned outside the card accommodating portion 130. The first fixed portion 516 is fixed on the circuit board 600 when the connector 10 is mounted on the circuit board 600.

Referring to FIGS. 4 to 7, the second contact piece 520 is held by the base 100. In particular, the second contact piece 520 of the present embodiment is distinct and separated from the reinforcing member 120 of the base 100. The second contact piece 520 is held by the holding member 110 of the base 100. In detail, the second contact piece 520 has a second held portion 522, a contact main portion 526, a second fixed portion 528 and an intersecting portion 530. The second held portion 522 is provided with a press-fit portion 524. The second held portion 522 is press-fit into the rear wall 116 of the holding member 110 of the base 100 by utilizing the press-fit portion 524.

The contact main portion 526 has a size in the up-down direction greater than a size of the contact main portion 526 in the lateral direction. In other words, a thickness direction of a parent metal plate of the contact main portion 526 of the second contact piece 520 matches a horizontal direction perpendicular to the up-down direction.

The contact main portion 526 extends forward in the front-rear direction from the second held portion 522. In other words, referring to FIGS. 1 and 4, the contact main portion 526 extends from the second held portion 522 toward the hinge mechanism 300 along the front-rear direction. Referring to FIGS. 4 to 7, the contact main portion 526 is positioned outside the card accommodating portion 130. In particular, the contact main portion 526 of the present embodiment extends forward in the deformation allowing portion 160. The contact main portion 526 is resiliently deformable, and the resilient deformation changes a contact state of the contact main portion 526 relative to the contact target portion 514 of the first contact piece 510.

Referring to FIGS. 4 and 6, the contact main portion 526 and the contact target portion 514 are positioned outside the card accommodating portion 130 as described above. Accordingly, the contact main portion 526 is able to be brought into contact with the contact target portion 514 at an outside of the card accommodating portion 130. As shown in FIG. 6, the contact main portion 526 of the present embodiment is in non-contact with the contact target portion 514 under no-load condition. In other words, the detection portion 500 according to the present embodiment is a normally open switch. However, the present invention is not limited thereto. The detection portion 500 may be configured to be a normally closed switch.

Figure 5:
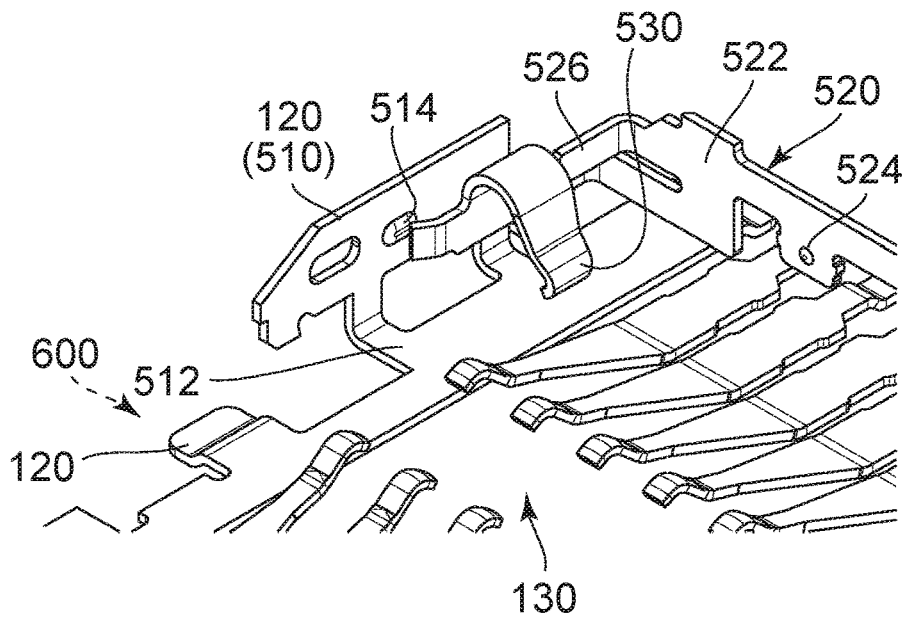
FIG. 5 is an enlarged, perspective view corresponding to FIG. 4, but with a holding member omitted.
Figure 7:
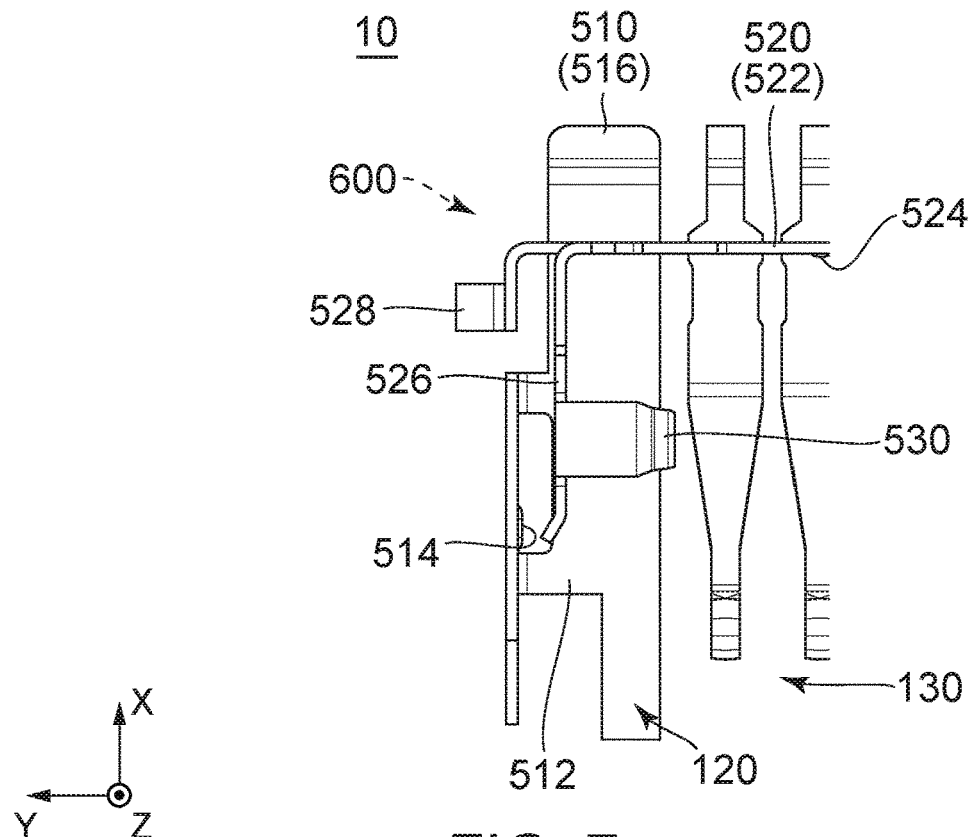
FIG. 7 is an enlarged, top view corresponding to FIG. 6, but with the holding member omitted.
Figure 8:
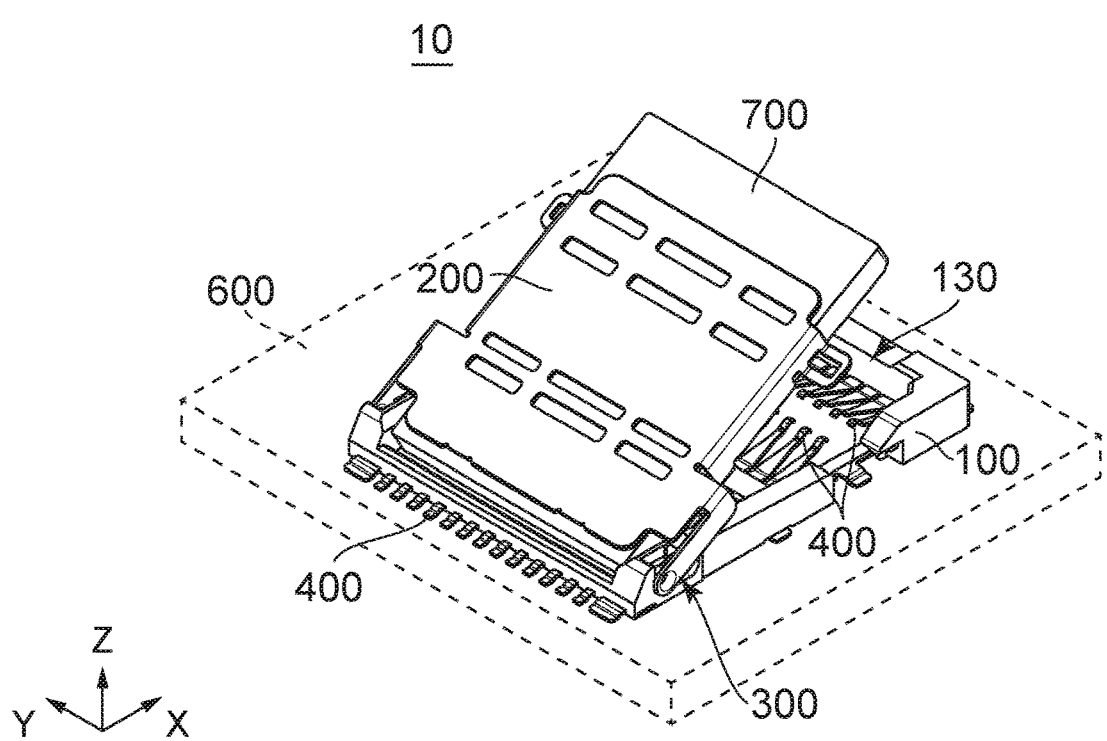
FIG. 8 is a perspective view showing the connector of FIG. 1. In the figure, the cover is in the middle of its opening and closing operation.

Referring to FIGS. 2 and 6, the second fixed portion 528 is positioned left of the contact main portion 526 in the lateral direction. The second fixed portion 528 is fixed on the circuit board 600 when the connector 10 is mounted on the circuit board 600. Referring to FIGS. 5 to 7, the contact main portion 526 is positioned between the press-fit portion 524 and the second fixed portion 528 in the lateral direction. This enables a position of a base of the contact main portion 526 to be stable when the contact main portion 526 is resiliently deformed.

Referring to FIGS. 4 and 6, the intersecting portion 530 is, at least in part, positioned in the card accommodating portion 130. The intersecting portion 530 of the present embodiment extends from the contact main portion 526 to an inside of the card accommodating portion 130 through the receiving portion 150.

As shown in FIGS. 4 and 5, in the card accommodating portion 130, the intersecting portion 530 intersects with both the up-down direction and a horizontal plane perpendicular to the up-down direction. Referring to FIGS. 1, 4 and 9, since the intersecting portion 530 is partially positioned in the card accommodating portion 130, the card 700 pushes the intersecting portion 530 downward in the up-down direction when the card accommodating portion 130 accommodates the card 700. Referring to FIGS. 5 to 7, the intersecting portion 530, which is pushed by the card 700, resiliently deforms the contact main portion 526 in the horizontal plane, so that the contact main portion 526 is brought into contact with the contact target portion 514. Referring to FIGS. 1, 4 to 7 and 9, when the card 700 pushes the intersecting portion 530 downward, the intersecting portion 530 changes the contact state of the contact main portion 526 relative to the contact target portion 514. As described above, the intersecting portion 530 converts a downward force to a force in the horizontal direction. Thus, the intersecting portion 530 itself can occupy a reduced space in the card accommodating portion 130.

Referring to FIGS. 4 to 7, the intersecting portion 530 is resiliently deformable. The intersecting portion 530 extends from the contact main portion 526 toward the inside of the card accommodating portion 130 in the horizontal plane and extends downward in the up-down direction. Referring to FIGS. 1, 4 to 7 and 9, upon the accommodation of the card 700, the intersecting portion 530 resiliently deforms the contact main portion 526 while being resiliently deformed by being pushed by the card 700. The intersecting portion 530 according to the present embodiment extends from an upper end of the contact main portion 526 to form an inverted U-shape and then extends obliquely downward. Since the intersecting portion 530 is resiliently deformable as described above, a contact force of the contact main portion 526 against the contact target portion 514 can be set to an appropriate force which is not too much strong.

In the aforementioned embodiment, only the intersecting portion 530 is positioned essentially inside the card accommodating portion 130 and a part of the detection portion 500 other than the intersecting portion 530 is positioned essentially outside the card accommodating portion 130. For example, the contact main portion 526 and the contact target portion 514 of the present embodiment are positioned outside the card accommodating portion 130 and the intersecting portion 530 of the present embodiment is partially positioned in the card accommodating portion 130. Thus, the detection portion 500 can occupy a reduced space in the card accommodating portion 130.

Although the specific explanation about the present invention is made above referring to the embodiments, the present invention is not limited thereto and is susceptible to various modifications and alternative forms without departing from the spirit of the invention.

Although the connector 10 of the aforementioned present embodiment comprises the hinge mechanisms 300, the present invention is not limited thereto. The connector 10 may comprise no hinge mechanism 300, provided that the card 700 can be accommodated in the card accommodating portion 130 from above.

Although the connector 10 of the aforementioned embodiment comprises the cover 200, the present invention is not limited thereto. The connector 10 may comprise no cover 200, provided that the connector 10 comprises a mechanism maintaining a state where the card 700 is accommodated in the card accommodating portion 130.

Although the connector 10 of the aforementioned embodiment is configured so that the first contact piece 510 is partially embedded in the holding member 110 of the base 100 via insert-molding while the second contact piece 520 is press-fit into the holding member 110, the present invention is not limited thereto. The first contact piece 510 may be press-fit into the holding member 110, and the second contact piece 520 may be partially embedded into the holding member 110 via insert-molding.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector mountable on a circuit board, the connector comprising a base, a plurality of terminals, and a detection portion, wherein:
    the base defines a card accommodating portion configured to accommodate a card from above in an up-down direction;
    the terminals are held by the base;
    the detection portion comprises a first contact piece and a second contact piece;
    the first contact piece is held by the base;
    the first contact piece has a contact target portion;
    the second contact piece is held by the base;
    the second contact piece has a contact main portion and an intersecting portion;
    the contact main portion is resiliently deformable;
    resilient deformation of the contact main portion changes a contact state of the contact main portion relative to the contact target portion;
    the intersecting portion is, at least in part, positioned in the card accommodating portion;
    the intersecting portion intersects with both the up-down direction and a horizontal plane perpendicular to the up-down direction;
    when the card pushes the intersecting portion downward in the up-down direction upon accommodation of the card within the card accommodating portion, the intersecting portion resiliently deforms the contact main portion in the horizontal plane so that the contact state is changed;
    the connector further comprises a cover and a hinge mechanism;
    the cover is attached to the base by the hinge mechanism;
    the base has a front end and a rear end in a front-rear direction perpendicular to the up-down direction;
    in the front-rear direction, the hinge mechanism is provided at a position which is closer to the front end of the base than to the rear end of the base; and
    the detection portion is positioned closer to the rear end of the base than to the front end of the base.

2. The connector as recited in claim 1, wherein:
    the contact target portion is positioned outside the card accommodating portion;
    the contact main portion is positioned outside the card accommodating portion;
    the contact main portion is able to be brought into contact with the contact target portion at an outside of the card accommodating portion;
    the base is provided with a receiving portion which communicates with the card accommodating portion; and
    the intersecting portion extends from the contact main portion to an inside of the card accommodating portion through the receiving portion.

3. The connector as recited in claim 1, wherein:
    the intersecting portion is resiliently deformable; and
    upon the accommodation of the card, the intersecting portion resiliently deforms the contact main portion while being resiliently deformed by being pushed by the card.

4. The connector as recited in claim 3, wherein the intersecting portion extends from the contact main portion toward an inside of the card accommodating portion in the horizontal plane and extends downward in the up-down direction.

5. The connector as recited in claim 1, wherein:
    the cover is provided with a card holding portion; and
    when the cover holding the card is closed, the card is accommodated in the card accommodating portion.

* * * * *